United States Patent
Shinosaka et al.

(10) Patent No.: US 9,343,945 B2
(45) Date of Patent: May 17, 2016

(54) SLIP RING DEVICE FOR ROTATING ELECTRIC MACHINE

(75) Inventors: Yoshihiro Shinosaka, Chiyoda-ku (JP); Shinichiro Minami, Chiyoda-ku (JP); Hitoshi Shibagaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/353,630

(22) PCT Filed: Feb. 9, 2012

(86) PCT No.: PCT/JP2012/052964
§ 371 (c)(1),
(2), (4) Date: Apr. 23, 2014

(87) PCT Pub. No.: WO2013/118273
PCT Pub. Date: Aug. 15, 2013

(65) Prior Publication Data
US 2014/0300218 A1    Oct. 9, 2014

(51) Int. Cl.
*H02K 13/00* (2006.01)
*H01R 39/16* (2006.01)
*H01R 39/34* (2006.01)
*H02K 13/02* (2006.01)
*H01R 39/08* (2006.01)
*H01R 43/10* (2006.01)

(52) U.S. Cl.
CPC ............... *H02K 13/02* (2013.01); *H01R 39/08* (2013.01); *H01R 39/16* (2013.01); *H01R 39/34* (2013.01); *H02K 13/003* (2013.01); *H01R 43/10* (2013.01)

(58) Field of Classification Search
CPC .............................. H02K 13/02; H02K 13/003
USPC .................................................. 310/43, 129, 71
See application file for complete search history.

(56) References Cited

U.S. PATENT DOCUMENTS

| 4,684,179 A * | 8/1987 | Freeman ..................... 439/27 |
| 2002/0092669 A1* | 7/2002 | Yagi ..................... 174/110 R |
| 2003/0155835 A1* | 8/2003 | Kondo et al. ................. 310/232 |

(Continued)

FOREIGN PATENT DOCUMENTS

| FR | 2928043 A1 | 8/2009 |
| JP | 10-336972 A | 12/1998 |

(Continued)

OTHER PUBLICATIONS

International Search Report for PCT/JP2012/062845 dated May 1, 2012.

(Continued)

*Primary Examiner* — Terrance Kenerly
(74) *Attorney, Agent, or Firm* — Sughrue Mion, PLLC

(57) ABSTRACT

Provided is a slip ring device for a rotating electric machine, which is capable of reliably retaining a long lead while preventing movement and deformation of the long lead during insert molding. The slip ring device for a rotating electric machine includes: a first ring and a second ring; a long lead (12) having one end portion connected to the first ring and another end portion connected to a rotor coil; a short lead having one end portion connected to the second ring and another end portion connected to the rotor coil; and a molded body formed by insert molding, for retaining the first ring, the second ring, the long lead (12), and the short lead in a mutually insulated fashion. The molded body includes a restricting member (15) for restricting the long lead (12) from being moved and deformed during the insert molding.

7 Claims, 3 Drawing Sheets

(56) References Cited

U.S. PATENT DOCUMENTS

2007/0257577 A1  11/2007  Bizjak
2009/0255186 A1  10/2009  Uchimura

FOREIGN PATENT DOCUMENTS

| | | |
|---|---|---|
| JP | 11-077736 A | 3/1999 |
| JP | 2003-244898 A | 8/2003 |
| JP | 2007-073250 A | 3/2007 |
| JP | 2008-061430 A | 3/2008 |

OTHER PUBLICATIONS

Communication dated Nov. 30, 2015 from the European Patent Office in counterpart application No. 12868174.9.

\* cited by examiner

SLIP RING DEVICE FOR ROTATING ELECTRIC MACHINE

CROSS REFERENCE TO RELATED APPLICATIONS

This application is a National Stage of International Application No. PCT/JP2012/052964 filed Feb. 9, 2012, the contents of all of which are incorporated herein by reference in their entirety.

TECHNICAL FIELD

The present invention relates to a slip ring device for an AC generator for a vehicle, which is to be mounted in a vehicle or the like.

BACKGROUND ART

As a related-art slip ring device for an AC generator for a vehicle, there is known a slip ring device including a deformation absorbing portion, which is provided, as a configuration for absorbing deformation of the lead and arranging the lead in a fixed position during a manufacturing step in which a slip ring to which the lead is connected is formed by integral molding with a resin material, to a lead portion contained in a connecting portion that connects a slip-ring supporting cylindrical portion and a coil connection terminal holding portion to each other.

As the deformation absorbing portion, there are described a bent portion which is bent in an approximately V-like or U-like shape so as to be easily deformable, a cutout portion having a reduced thickness to locally lower strength, and a through hole portion intersecting a shaft, which similarly has locally lowered strength (for example, see Patent Literature 1).

CITATION LIST

Patent Literature

[PTL 1] Japanese Patent No. 3812456

SUMMARY OF INVENTION

Technical Problems

The slip ring device described above presupposes the deformation of the corresponding portion having locally lowered strength when manufacturing the slip ring device by insert molding. However, the deformation itself is not controlled. Therefore, there is a fear in that the lead, which is a conductor, may be exposed externally from an insulating member depending on the degree of deformation.

A connecting-portion insulating member, which is provided to embed the lead, does not have a margin in a radial thickness. Moreover, even if the deformation of the bent portion is within the range of thickness in terms of design, there is a doubt whether actual deformation occurs within the above-mentioned range.

The cutout portion and the through hole portion do not have such a configuration that a lead thickness direction is increased, but has the same configuration that an applied external force is absorbed as a result of the deformation of the portion described above. Therefore, it is hard to say that there is no fear of external exposure from the connecting-portion insulating member due to the deformation.

In any of the cases described above, the slip ring device is used in the vehicle over a long period of time without understanding in which form the lead is contained as a definitive state in the insulating member. In particular, the cutout portion and the through hole portion have a more noticeable problem in that there is an undeniable fear of breakage of the lead itself, which cannot resist against the external force.

The present invention has been made to solve the problems described above, and therefore has an object to provide a slip ring device for a rotating electric machine, which is capable of reliably retaining a long lead while preventing movement and deformation of the long lead during insert molding.

Solution to Problems

According to one embodiment of the present invention, there is provided a slip ring device for a rotating electric machine, including: a first ring and a second ring disposed coaxially in a mutually insulated fashion; a long lead having one end portion connected to the first ring and another end portion connected to a rotor coil; a short lead having one end portion connected to the second ring and another end portion connected to the rotor coil; and a molded body formed by insert molding, for retaining the first ring, the second ring, the long lead, and the short lead in a mutually insulated fashion, in which: the molded body includes a restricting member for restricting the long lead from being moved and deformed during the insert molding.

Advantageous Effects of Invention

According to the slip ring device for the rotating electric machine of the present invention, the molded body includes the restricting member for restricting the long lead from being moved and deformed during the insert molding. Therefore, the long lead is prevented from being moved and deformed during the insert molding. As a result, the long lead can be reliably retained.

DESCRIPTION OF EMBODIMENTS

Referring to the accompanying drawings, an embodiment of the present invention is described below. In the description,

First Embodiment

Figure 1:
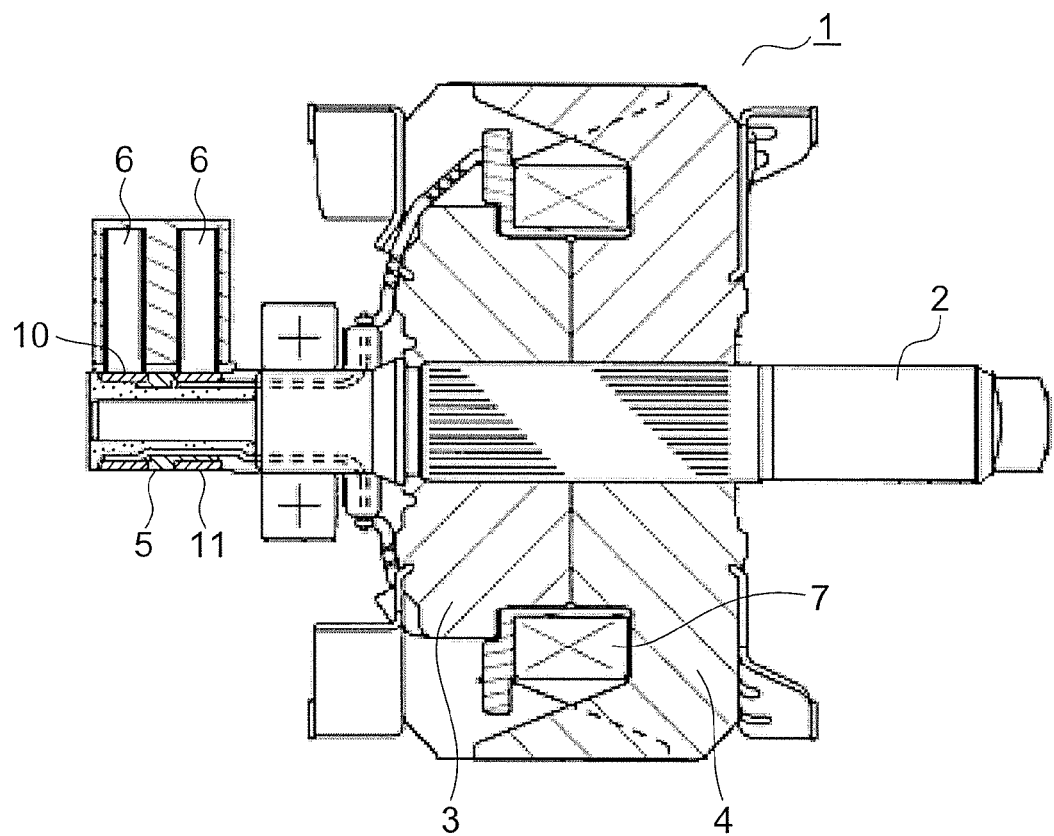
FIG. 1 is a sectional view taken along an axial direction, for illustrating a rotor of an AC generator for a vehicle.

FIG. 1 is a sectional view taken along an axial direction, for illustrating a rotor 1 of an AC generator for a vehicle, which includes a slip ring device 5 according to a first embodiment of the present invention.

The rotor 1 of the AC generator for a vehicle (hereinafter abbreviated as "generator") is provided on an inner side of a stator (not shown) which is fixed to an inner wall of a case (not shown), and is fixed to a shaft 2.

The rotor 1 includes a pair of claw-like magnetic poles 3 and 4 which are opposed to each other and a rotor coil 7 formed by winding a conductor, which is provided inside the claw-like magnetic poles 3 and 4.

The stator includes a stator coil (not shown) wound around a stator core (not shown).

A pulley (not shown) is fixed to one end portion of the shaft 2, whereas the slip ring device 5 is inserted over and fixed to another end portion thereof.

In the generator having the configuration described above, a current is supplied from a battery (not shown) through brushes 6 and the slip ring device 5 to the rotor coil 7 of the rotor 1 to generate a magnetic flux. As a result, the N-pole and the S-pole are respectively generated in the claw-like magnetic poles 3 and 4 of the rotor 1.

On the other hand, the pulley is driven by an engine. Then, the rotor 1 is rotated by the shaft 2. Therefore, a rotating magnetic field is applied to the stator core to generate an electromotive force in the stator coil.

Figure 2:
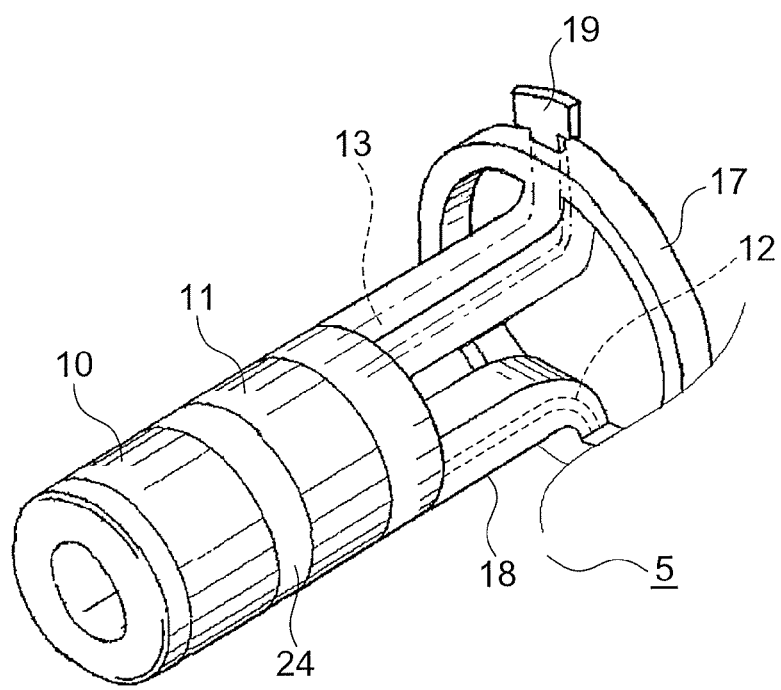
FIG. 2 is a perspective view illustrating the slip ring device illustrated in FIG. 1.
Figure 3:
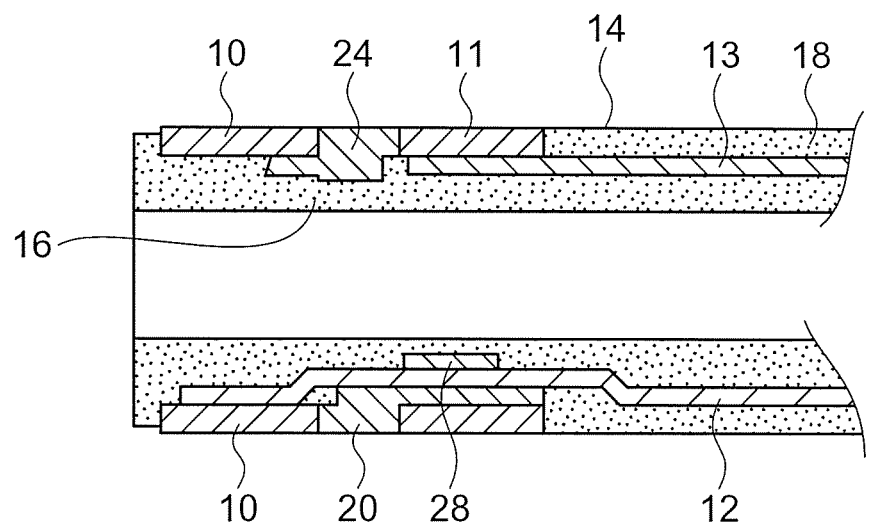
FIG. 3 is an enlarged sectional view of a principal part of the slip ring device illustrated in FIG. 2.

FIG. 2 is a perspective view illustrating the slip ring device 5 illustrated in FIG. 1, and FIG. 3 is an enlarged sectional view of a principal part of the slip ring device 5 illustrated in FIG. 2.

The slip ring device 5 includes a first ring 10, a second ring 11, a long lead 12 having one end portion connected to the first ring 10 by welding and another end portion connected to the rotor coil 7 by welding, a short lead 13 having one end portion connected to the second ring 11 by welding and another end portion connected to the rotor coil 7 by welding, and a molded body 14 formed by insert molding, which retains the first ring 10, the second ring 11, the long lead 12, and the short lead 13 in a mutually insulated fashion.

The molded body 14 includes a molded-body main body 16 having a cylindrical shape, a terminal supporting portion 17 having an annular shape, which supports terminal portions 19 of the long lead 12 and the short lead 13 that are connected to the rotor coil 7, and connecting portions 18 which cover the long lead 12 and the short lead 13 and connect the terminal supporting portion 17 and the molded-body main body 16 to each other.

Figure 4:
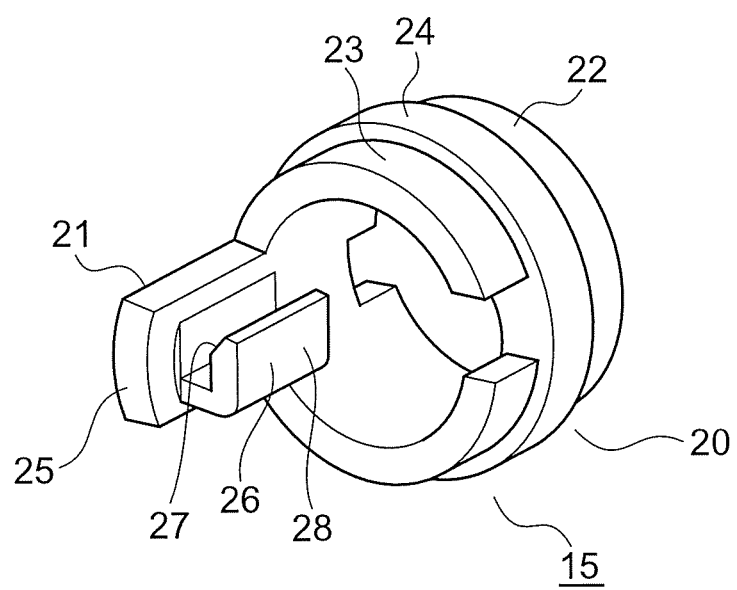
FIG. 4 is a perspective view illustrating a restricting member of the slip ring device illustrated in FIG. 2.
Figure 5:
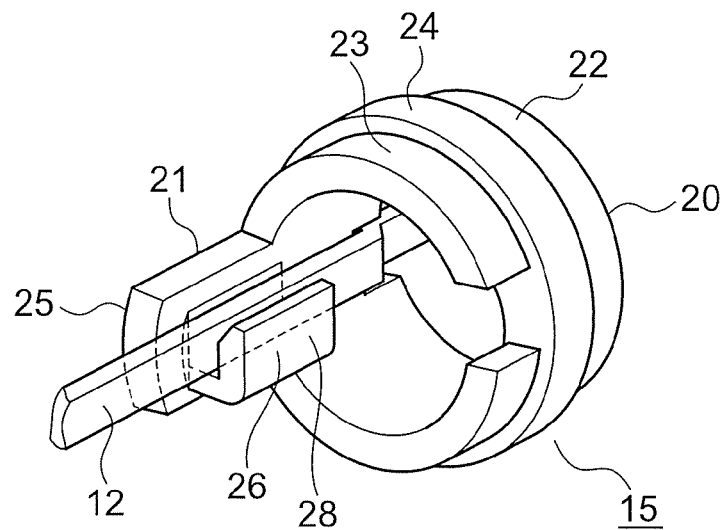
FIG. 5 is an outline perspective view showing the state where a long lead is provided with a restricting member illustrated in FIG. 4.

FIG. 4 is an overall perspective view illustrating a restricting member 15 which constitutes a part of the molded-body main body 16.

The restricting member 15 includes a restricting-member main body 20 having an annular shape and a lead restricting portion 21 which has a distal end portion extending from the restricting-member main body 20 in an axial direction and is integral with the restricting-member main body 20.

The restricting-member main body 20 includes a first-ring supporting portion 22 having an annular shape, which supports the first ring 10, a second-ring supporting portion 23 having an annular shape, which supports the second ring 11, and an inter-shaft supporting portion 24 which is provided between the first-ring supporting portion 22 and the second-ring supporting portion 23 and is larger than the first-ring supporting portion 22 and the second-ring supporting portion 23.

A length of the inter-shaft supporting portion 24 in the axial direction is a length which enables the insulation between the first ring 10 and the second ring 11 to be ensured.

The lead restricting portion 21 includes a restricting-portion main body 25 which has a distal end portion extending from the first-ring supporting portion 22 in the axial direction, an arc-like outer circumferential surface, and an arc-like inner circumferential surface having a plane portion only in a part thereof (portion along a rear surface of the long lead 12), and a locking portion 26 having an L-like shape, which is provided on the plane of the restricting-portion main body 25 in a projecting manner. The locking portion 26 has a tapered portion 27 at a distal end of a vertical portion 28.

Next, a manufacturing step of the slip ring device for the generator, which has the configuration described above, is briefly described.

First, the distal end portion of the long lead 12 is connected to the first ring 10 by welding, whereas the distal end portion of the short lead 13 is connected to the second ring 11 by welding.

Next, the first ring 10 is fitted over the first-ring supporting portion 22 so that the long lead 12 already welded to the first ring 10 is inserted between the restricting-portion main body 25 and the locking portion 26.

Moreover, the second ring 11 to which the short lead 13 is welded is fitted over the second-ring supporting portion 23.

Thereafter, the second ring 11 to which the short lead 13 is welded and the first ring 10 to which the long lead 12 is welded are placed at a predetermined position in a molding die.

When placing the first ring 10, the long lead 12 is inserted between the restricting-portion main body 25 and the locking portion 26. In the vicinity thereof, the long lead 12 deviates so as to ensure a predetermined insulating distance from the second ring 11 as illustrated in FIG. 3.

Thereafter, a melted resin material is injected into the molding die in this state. After elapse of predetermined molding time, the molding die is released to complete the slip ring device 5.

According to the slip ring device 5 for the generator, which has the configuration described above, the molded body 14 includes the restricting portion 15 which restricts the movement and deformation of the long lead 12 during the insert molding. Therefore, the long lead 12 is prevented from being moved and deformed during the insert molding. As a result, the long lead 12 is reliably retained.

Thus, the long lead 12 can be prevented from coming in contact with the second ring 11 having a different potential due to a pressure of the resin during the insert molding.

Moreover, the occurrence of an event in which the moved or deformed long lead 12 abuts against an inner wall of the die to damage the die when the long lead is placed in the molding die can be avoided.

Further, the first ring 10 and the second ring 11 are separated away from each other by the inter-shaft supporting portion 24 of the restricting member 15 to reliably ensure the insulating distance.

The radial movement and deformation of the long lead 12 are easily restricted by the lead restricting portion 21 extending from the second-ring supporting portion 23 in the axial direction.

Moreover, the lead restricting portion 21 is formed to have a simple structure including the restricting-portion main body 25 extending from the second-ring supporting portion 23 in the axial direction and the locking portion 26 having the L-like sectional shape, which extends inward from the restricting-portion main body 25 in the radial direction.

A clearance between the vertical portion 28 of the locking portion 26 and the surface of the restricting-portion main body 25 is approximately equal to a section size of the long lead 12. Therefore, the movement of the long lead 12 is suppressed when the long lead 12 is placed in the die. Correspondingly, workability in the insert molding is improved.

Further, the vertical portion 28 includes the tapered portion 27 formed at the distal end, which gradually enlarges toward an opening side. Therefore, the long lead 12 is smoothly locked to the locking portion 26. As a result, the long lead 12 is prevented from abutting against the vertical portion 28 when a locking operation of the long lead 12 is performed to reduce breakage of the vertical portion 28 and the long lead 12.

Figure 6:
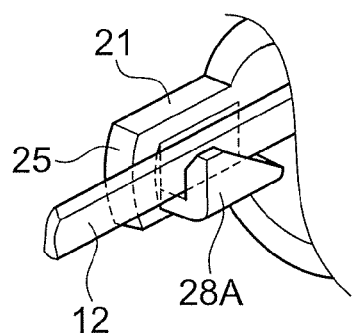
FIG. 6 is a partial perspective view showing the modification of a locking portion of a restricting member.

As illustrated in FIG. 6, a vertical portion 28A having a trapezoidal shape as viewed along the radial direction may be provided instead.

Figure 7:
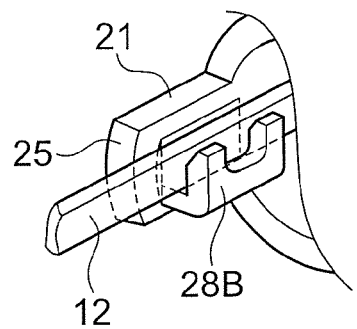
FIG. 7 is a partial perspective view showing the modification of further others of a locking portion of a restricting member.

As illustrated in FIG. 7, a vertical portion 28B having a U-like shape as viewed along the radial direction may be provided instead.

The vertical portions 28A and 28B are smaller than the vertical portion 28. Therefore, the amount of resin can be correspondingly saved.

Moreover, the long lead 12 locked to the locking portion 26 is fixed with a larger amount of resin as compared with the amount of resin used to fix the long lead with the vertical portion 28. Therefore, the breakage of the long lead 12 at the locking portion 26 due to vibrations or the like can be further reduced.

In the embodiment described above, the lead restricting portion 21 of the restricting member 15 has a sideways U-like sectional shape so as to restrict the radial movement and deformation of the long lead 12. However, it is apparent that the lead restricting portion is not limited thereto. For example, the lead restricting portion may have a ring-like shape.

Moreover, although the AC generator to be applied to the AC generator for a vehicle has been described in the above-mentioned embodiment, the present invention is also applicable to, for example, an AC generator for an outboard engine.

Further, the present invention is also applicable to an electric motor.

The invention claimed is:

1. A slip ring device for a rotating electric machine, comprising:
    a first ring and a second ring disposed coaxially in a mutually insulated fashion;
    a long lead having one end portion connected to the first ring and another end portion connected to a rotor coil;
    a short lead having one end portion connected to the second ring and another end portion connected to the rotor coil; and
    a molded body formed by insert molding, for retaining the first ring, the second ring, the long lead, and the short lead in a mutually insulated fashion,
    wherein the molded body includes a restricting member for restricting the long lead from being moved and deformed during the insert molding, the restricting member comprising:
        a first-ring supporting portion to be brought into surface contact with an inner circumferential surface of the first ring so as to support the first ring;
        a second-ring supporting portion to be brought into surface contact with an inner circumferential surface of the second ring so as to support the second ring;
        an inter-shaft supporting portion provided between the first-ring supporting portion and the second-ring supporting portion, the inter-shaft supporting portion being larger than the first-ring supporting portion and the second-ring supporting portion; and
        a lead restricting portion extending from the second-ring supporting portion in an axial direction, for restricting the long lead from being moved and deformed in a radial direction.

2. A slip ring device for a rotating electric machine according to claim 1, wherein the lead restricting portion comprises:
    a restricting-portion main body extending from the second-ring supporting portion in the axial direction; and
    a locking portion having an L-like sectional shape extending inward from the restricting-portion main body in the radial direction.

3. A slip ring device for a rotating electric machine according to claim 2,
    wherein the locking portion comprises a vertical portion facing the restricting-portion main body, and
    wherein a clearance between the vertical portion and a facing surface of the restricting-portion main body is approximately equal to a section size of the long lead.

4. A slip ring device for a rotating electric machine according to claim 3, wherein the vertical portion comprises a tapered portion formed at a distal end, which enlarges toward an opening side.

5. A slip ring device for a rotating electric machine according to claim 3, wherein the vertical portion has a trapezoidal shape as viewed along the radial direction.

6. A slip ring device for a rotating electric machine according to claim 3, wherein the vertical portion has a U-like shape as viewed along the radial direction.

7. A slip ring device for a rotating electric machine according to claim 1, wherein the rotating electric machine comprises an in-vehicle AC generator.

\* \* \* \* \*